March 2, 1971  R. D. GERARD  3,567,327
MAGNETIC COMPASS DIRECTION INDICATING SYSTEM
Filed Nov. 2, 1967  2 Sheets-Sheet 1

INVENTOR.
Robert D. Gerard
BY
C. E. Vautrain Jr., Agent

March 2, 1971 R. D. GERARD 3,567,327
MAGNETIC COMPASS DIRECTION INDICATING SYSTEM
Filed Nov. 2, 1967 2 Sheets-Sheet 2

INVENTOR.
Robert D. Gerard
BY

United States Patent Office 3,567,327
Patented Mar. 2, 1971

3,567,327
MAGNETIC COMPASS DIRECTION
INDICATING SYSTEM
Robert D. Gerard, Palisades, N.Y., assignor to the United States of America as represented by the Secretary of the Navy
Filed Nov. 2, 1967, Ser. No. 680,141
Int. Cl. G01b 11/26
U.S. Cl. 356—152                                 8 Claims

ABSTRACT OF THE DISCLOSURE

An analog signal representing the lubber line heading of a magnetic compass is obtained by projecting a narrow plane of light through an optical wedge, or a spot of light along a slit, and then converting the intensity of the planar light or the position of the spot of light into a directly read compass heading.

---

The invention described herein may be manufactured and used by or for the Government of the United States of America for governmental purposes without the payment of any royalties thereon or therefor.

This invention relates generally to data transmission systems and more particularly to compass systems wherein lubber line headings of a magnetic compass are presented without physical or magnetic contact with the compass moving parts.

In means for providing magnetic compass readings such as eye-level presentations of headings or remote presentations thereof, some previous devices and systems have employed optical digital-encoding discs as the compass card from which a signal representing lubber line heading is obtained. These devices and systems thus are limited to a digital readout for compass orientation, requiring relatively complex illumination, detection, amplification and indication means. Other prior devices include either a polaroid disc or direct electrical pickups, the polaroid disc requiring a servo drive motor and being susceptible of considerable inaccuracies with respect to linearity while direct electrical pickup systems introduce inaccuracies by reducing the actuating forces of the compasses such that the systems are rendered inoperative from a practical standpoint.

The present invention overcomes the disadvantages of such magnetic compass direction indication systems through use of an analog readout apparatus and system which is superior in performance and requires a minimum of inexpensive components. A linear, stepless signal is provided which is readily registered on an electric meter or analog recorder. No-contact signal generation is obtained by means of light energy traversing either a neutral-density circular wedge or a spiral slit or groove in an opaque rotating member.

Accordingly, it is an object of the present invention to provide an improved method of reading magnetic compass card positions without physical or magnetic contact with the compass moving parts.

Another object of this invention is to provide an improved method of and means for obtaining magnetic compass readings through use of a linear signal.

A further object of this invention is to provide a means and method for obtaining magnetic compass headings through an analog signal representing the lubber line heading thereof.

Other objects, advantages and novel features of the invention will become apparent from the following detailed description thereof when considered in conjunction with the accompanying drawings in which like numerals represent like parts throughout and wherein.

Figure 1:
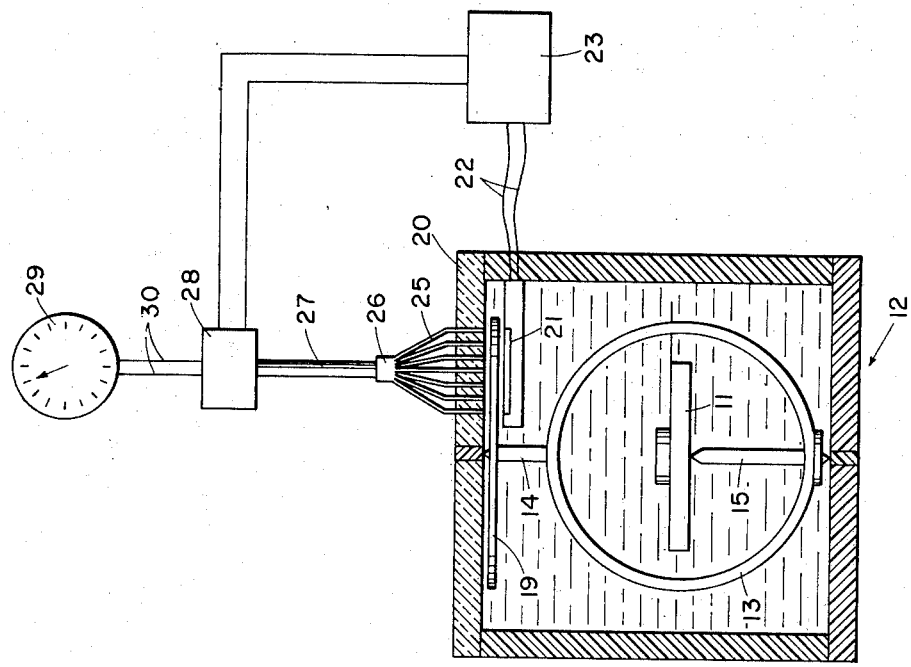
FIG. 1 is a schematic diagram of a typical oil-damped magnetic compass having one embodiment of the automatic reading means of the present invention associated therewith.

Referring to the drawings, the embodiment of FIG. 1 includes an oil-damped compass 11 supported within a sealed chamber 12, the compass being mounted in a ring 13 supported by shaft means 14 and 15. Attached to shaft means 14 is a neutral-density circular optical wedge 19 which rotates in close proximity to the upper wall 20 of chamber 12, this wall preferably being formed of transparent material such as Lucite. Positioned under a selected portion of wedge 19 is a light source 21 which is connected by conductors 22 to a power source 23. Disposed in window 20 above the light source 21 is a bundle of optical fibers 25 which are dispersed at the region of the window to span light source 21 and converge to form a compact bundle as indicated at 26. The light transmitting fibers converge the light transversing wedge 19 to a spot of light upon a light receptor 27. Receptor 27 may be a photo-resistive device having a high resistance ratio between peak illumination and dark and is selected for fast time response, low temperature error and high linearity. Receptor 27 transmits light to and is a component of a half-bridge circuit 28 the output of which is fed to an electric meter 29 by conductors 30. Meter 28 preferably is calibrated in degrees from 0 to 360 for full deflection.

Figure 2:
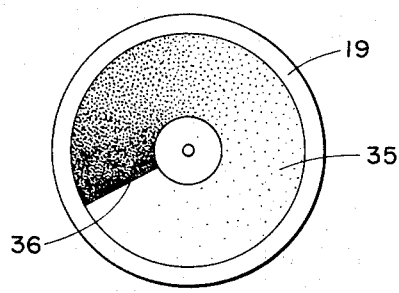
FIG. 2 is an enlarged view of a variable density optical means which may be used in the embodiment of FIG. 1.

FIG. 2 shows one form of neutral-density wedge 19 which may be used, this form having a band 35 of a light transmitting material distributed such that a maximum of light is transmitted at the end adjacent to and counter-clockwise from a dividing line 36. Band 35 gradually decreases in light transmission characteristics to a minimum transmisson at the end adjacent to and clockwse from line 36.

Figure 4:
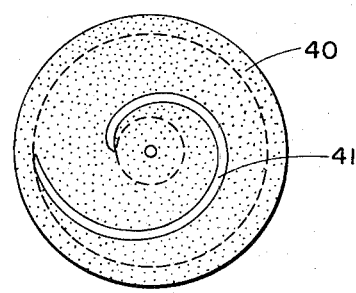
FIG. 4 is an enlarged view of an optical means that may be used in the embodiment of FIG. 3.
Figure 3:
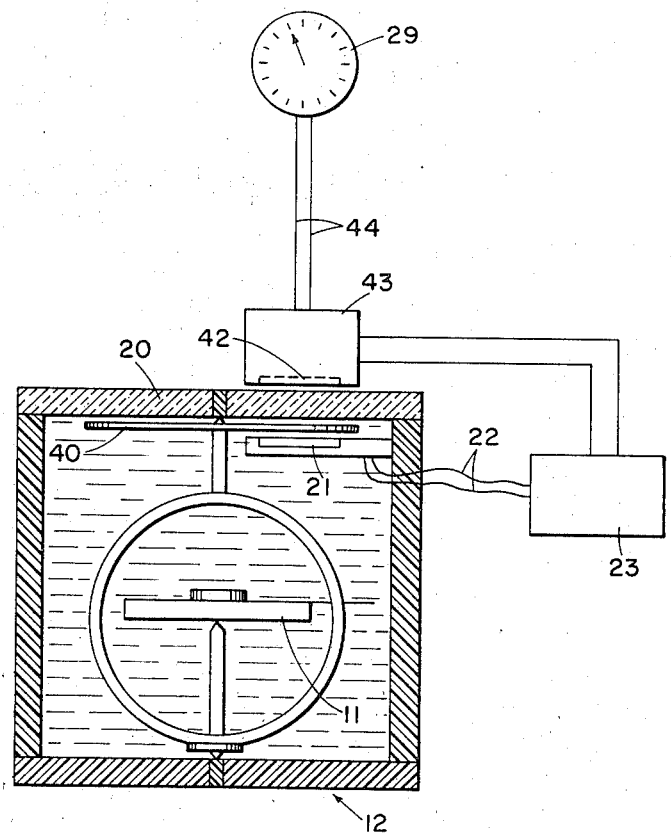
FIG. 3 is a schematic diagram of a second embodiment of the invention using a different form of optical means.

In FIG. 3 the system of FIGS. 1 and 2 is varied to accommodate in lieu of the neutral-density wedge 19 an opaque disc 40. FIG. 4 shows disc 40 in detail, having a spiral groove 41 formed therein so that when disc 40 is in position in housing 12 groove 41 will permit light to be transmitted at varying points depending on the rotational position of disc 40 above the light source 21. In this embodiment, a linear form of light receptor 42 is combined with a half-bridge circuit 43 and the signal therefrom is transmitted to meter 29 by conductors 44.

Figure 5:
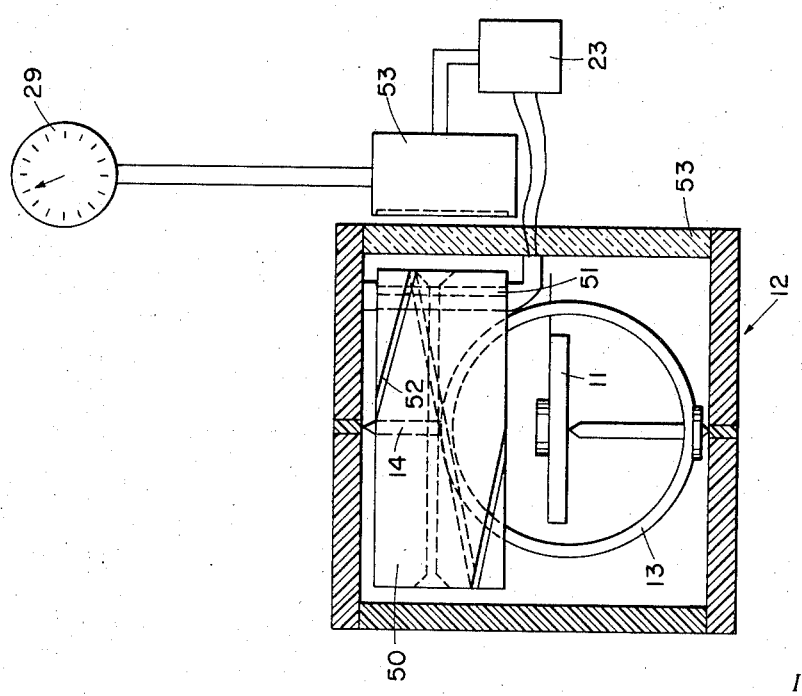
FIG. 5 is a schematic diagram of a third embodiment of the invention.

FIG. 5 is a further embodiment of direct reading by light projection. In this embodiment a drum 50 is supported on shaft 14 for rotation, replacing discs 19 and 40 of respective FIGS. 1 and 2. Light source 51 is disposed vertically within and adjacent to the inner surface of the drum and direct light through a spiral groove 52 in drum 50 toward a combined light receptor and half-bridge circuit 53. In this embodiment side wall 53 is transparent.

In each of the embodiments, a means is provided for the analog readout of information representing changing headings of the compass with respect to the lubber line associated therewith. The readout in each embodiment is obtained without direct contact with the compass 11. Each embodiment may be calibrated in an electromagnetic field, the compass being aligned in such a way that the 100% transmittance position of the circular wedge or the origin of groove 41 and 52 would coincide when the readout meter is adjusted for one extreme of its deflection. A slight shift in the applied electromagnetic field then would shift the wedge, disc or drum to a position which would provide for the opposite full-scale deflection of the readout meter.

In operation, the magnetic compass 11 in rotating from one position to another would, in the embodiment of FIG. 1, displace transversely with respect to the light source the neutral-density wedge to a position of greater or less light transmittance. This change in position would present a change in the light energy being focused at the light receptor, with the amount of light energy transmitted thus determining the strength of the signal transmitted to the electric meter and therefore the heading between 0 and 360° of the meter needle. In the embodiment of FIG. 3, the fine transparent spiral in opaque disc 40 permits a spot of light to pass through window 20 to impinge upon photo-receptive element 42. The position of the spot of light between the left and right extremes of element 42 provides a signal for determining each degree of rotation of the compass from 0 to 360°. The varying resistance of the photo-receptive device is then converted to a varying voltage through the half-bridge circuit or other appropriate circuitry and conducted to meter 28 where the compass heading is displayed. The operation of the embodiment of FIG. 5 is substantially identical to that of FIG. 3. In FIG. 5, however, a greater length of photo-receptive element is possible and therefore a finer definition of signal per unit of movement may be obtained.

Obviously many modifications and variations of the present invention are possible in the light of the above teachings. For example, an optical bridge could be used where both the forward light path and a balanced back path of light from the same source would be directed to a common photomultiplier. It is therefore to be understood that within the scope of the appended claims the invention may be practiced otherwise than as specifically described.

What is claimed is:
1. A magnetic compass direction indicating system wherein there is no physical or magnetic contact with the compass moving parts comprising:
   a magnetic compass rotatably mounted in damping fluid in a sealed chamber;
   a compass mounting including a ring in which said compass is positioned;
   upper and lower shaft means connected to said ring and positioned for rotation in said chamber;
   light transmitting means of variable density rotatably mounted on said upper shaft means and disposed transverse thereto;
   a fixed light source in said chamber disposed parallel to and on the side of said light transmitting means remote from the adjacent wall of said chamber;
   light conducting means in said adjacent wall;
      said light conducting means converging outside of said chamber so as to concentrate received light onto a light receiving means;
   bridge means having said light receiving means included as a variable resistive element therof for providing a rectified signal output responsive to variations of light intensity in said light receiving means; and
   elctric meter means connected to said bridge means and responsive to changes in said rectified signal output;
      said meter means calibrated to indicate from 0° to 360° linearly over its full scale deflection;
      whereby azimuthal movement of said magnetic compass will produce corresponding deflection of the indicator of said meter means.
2. The apparatus as defined in claim 1 wherein said light source is adapted to direct light in a substantially planar band;
   said light transmitting means inculding a neutral-density circular optical wedge,
   said wedge disposed so that radii thereof are in register with said light band upon rotation of said light transmitting means.
3. The apparatus as defined in claim 2 wherein said light conducting means includes a plurality of optical fibers disposed linearly in register with said light source; and
   said fibers terminating at the end remote from said chamber and coterminous with one end of said light receiving means.
4. Apparatus for indicating the lubber line heading of a magnetic compass comprising:
   a magnetic compass disposed for rotation in a fluid-filled chamber;
   means in said chamber for directing light energy in a selected shape outward therefrom;
   light controlling means rotatable with said compass and disposed between said light directing means and the adjacent wall of said chamber;
   the adjacent wall of said chamber adapted to transmit said directed light therethrough;
   photo-resistive means disposed outside said chamber in register with said light directing means;
   bridge means and means connecting said photo-resistive means and said bridge means for varying the output thereof in response to the light intercepted by said photo-sensitive means;
   a power source connected to said light directing means and said bridge means; and
   indicating means connected to said bridge means,
      said indicating means including a scale and an indicator for indicating in degrees the lubber line heading of said magnetic compass.
5. The apparatus as defined in claim 4 wherein said light directing means is adapted to direct light in a substantially planar band;
   said light controlling means including an opaque disc having a continuous opening therein to permit passage of light;
   said opening disposed so as to pass increments of said band of light in the form of beams whose radial position with respect to the axis of rotation of said compass is directly related to the lubber line heading of said compass.
6. The apparatus as defined in claim 5 wherein said opening is a spiral groove terminating at one end of a point opposite one edge of said band of light and at the other end of a point opposite the other edge of said band of light.
7. The apparatus as defined in claim 4 wherein said light directing means is adapted to direct light in a substantially planar band;
   said light controlling means including an opaque drum having a continuous opening therein to permit passage of light;
   said opening disposed so as to pass increments of said band of light in the form of beams whose transverse position with respect to the axis of rotation of said compass is directly related to the lubber line heading of said compass.
8. The apparatus as defined in claim 7 wherein said opening is a spiral groove terminating at one end at a point opposite one edge of said band of light and at the other end at a point opposite the other edge of said band of light.

References Cited
UNITED STATES PATENTS

| | | | |
|---|---|---|---|
| 2,806,402 | 9/1957 | Ferris | 356—152 |
| 2,845,710 | 8/1958 | Claret | 356—152 |

RICHARD A. FARLEY, Primary Examiner

J. G. BAXTER, Assistant Examiner